W. MURRY.
ARTIFICIAL BAIT.
APPLICATION FILED JUNE 19, 1908.
962,237.
Patented June 21, 1910.
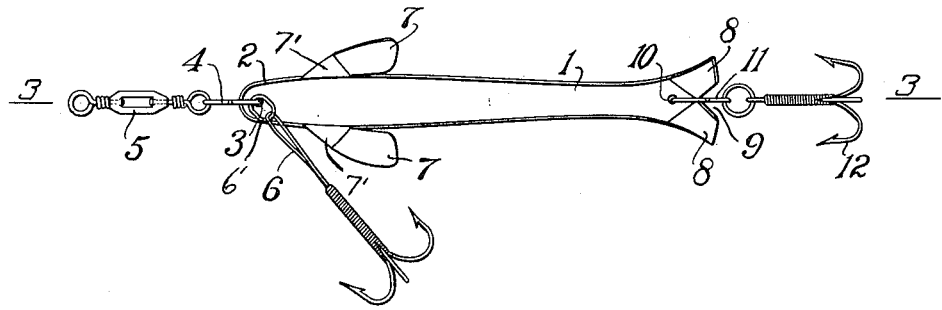
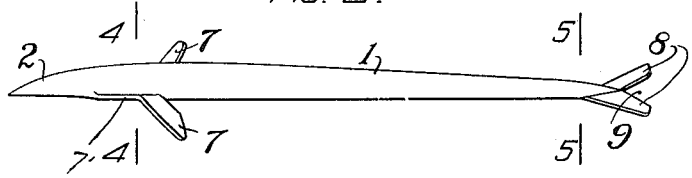
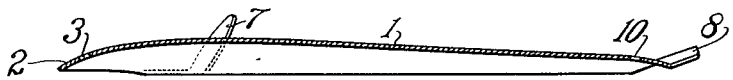
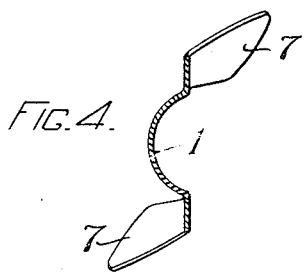
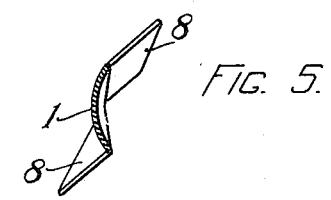
WITNESSES
O. T. Palmer
R. B. Ellens.
INVENTOR
William Murry.
BY Ellis Spear Jr.
ATTY.

UNITED STATES PATENT OFFICE.

WILLIAM MURRY, OF AUBURN, MAINE.

ARTIFICIAL BAIT.

962,237.

Specification of Letters Patent. Patented June 21, 1910.

Application filed June 19, 1908. Serial No. 439,420.

*To all whom it may concern:*

Be it known that I, WILLIAM MURRY, a citizen of the United States, residing at Auburn, county of Androscoggin, State of Maine, have invented certain new and useful Improvements in Artificial Bait, of which the following is a specification.

This invention relates to artificial baits and particularly to an artificial trolling bait intended to approximate in its appearance and action a living minnow. In baits of this sort it is desirable to have its course through the water so directed and its movements occur in such a manner that it will appear when drawn as a troll to the fish sought to be lured, to be a real minnow endeavoring to escape, stimulating the fish desired to strike quickly and viciously and thus assuring the proper seizure of the bait and the contact with the hooks.

It is the object of the present invention, therefore, to provide a bait which shall fulfil these requirements and to this end I have devised my present invention which I will more fully describe in the following specification, and of which I have disclosed an embodiment in the accompanying drawing.

In the drawing and the accompanying specification references to the various parts are identified by like reference numerals.

In the drawings Figure 1 is a side view of an artificial minnow, Fig. 2 is an edge view, Fig. 3 is a section on the line 3—3, Fig. 1, Fig. 4 is a section on the line 4—4, Fig. 2, and Fig. 5 is a section on line 5—5, Fig. 2.

1 is a minnow body, preferably made of some light metal composition and formed semicylindrical or curved in cross section. The head of the minnow 2 is substantially quadrispherical (see Fig. 2) and is pierced near its forward end by an eyelet 3 in which is a ring 4 to which is attached a swivel 5. The head hooks 6 which are preferably a treble gang are attached by a split ring 6¹. Just back of the head are formed fins 7 which are formed at 7¹ adjacent to the body with flattened portions lying in the same plane, which plane is substantially that including the edges of the body portion 1 of the minnow. The fins proper 7 are flared in opposite directions to impart to the minnow when it is dragged through the water a spinning tendency. At the opposite end the bait is provided with tail flanges 8 separated by a notch 9 and oppositely flared to correspond with the fins 7 to further impart a spinning tendency. It is to be noted that the minnow is of less width at the tail and the tail flanges 8, therefore, come within the line of the fins 7 and on account of this have a separate field of activity. The tail flanges follow the concaved body portion 1 and are modified in their action by the body variations due to the shape of the head and the curve of the body, thus causing the bait to travel in an irregular path.

10 is an eyelet in the tail of the minnow in which is a ring 11 carrying the treble tail hooks 12.

The minnow is used in the usual manner, either by trolling or casting. As pointed out herein above, its motions are irregular, approximating the darting, hesitating, agitated movements of a small fish endeavoring to make its escape.

What I, therefore, claim and desire to secure by Letters Patent is:—

1. A device of the class described comprising a channel shaped body having a quadrispherical head at its forward end and oppositely disposed means to impart to it a spinning tendency.

2. A device of the class described comprising a body having a convex surface on one side and a concave surface on its opposite side and terminating at its forward end in a quadrispherical head, and oppositely disposed flanges at the tail end of the minnow to impart to it a spinning tendency.

In testimony whereof I affix my signature in the presence of two witnesses.

WILLIAM MURRY.

Witnesses:
 HARRY P. CARVER,
 HEBER H. CLEVELAND.